US006062623A

United States Patent [19]

Lemmen

[11] Patent Number: 6,062,623

[45] Date of Patent: May 16, 2000

[54] LATCH FOR VEHICLE OVERHEAD STORAGE BIN

[75] Inventor: Curtis L. Lemmen, Hudsonville, Mich.

[73] Assignee: Prince Corporation, Holland, Minn.

[21] Appl. No.: 09/081,289

[22] Filed: May 18, 1998

[51] Int. Cl.[7] ..................................................... B60R 11/00

[52] U.S. Cl. ........................ 296/37.8; 296/37.7; 224/282; 224/311

[58] Field of Search ................................ 296/37.8, 37.7, 296/37.12, 37.9; 224/282, 311, 312; 292/DIG. 37, DIG. 31

[56] References Cited

U.S. PATENT DOCUMENTS

| | | |
|---|---|---|
| 84,031 | 11/1868 | Walker . |
| 459,080 | 9/1891 | Clark et al. . |
| 794,913 | 7/1905 | Wynn . |
| 2,197,195 | 4/1940 | Schemers . |
| 3,220,759 | 11/1965 | Miller . |
| 3,455,590 | 7/1969 | Zerfoss . |
| 4,072,332 | 2/1978 | Isaia . |
| 4,469,365 | 9/1984 | Marcus et al. . |
| 4,595,228 | 6/1986 | Chu . |
| 4,867,498 | 9/1989 | Delphia et al. . |
| 5,050,922 | 9/1991 | Falcoff . |
| 5,062,559 | 11/1991 | Falcoff . |
| 5,267,761 | 12/1993 | Curtindale et al. . |
| 5,388,880 | 2/1995 | Kinane . |
| 5,522,638 | 6/1996 | Falcoff et al. . |
| 5,556,145 | 9/1996 | Takasaki ......................... 292/DIG. 37 |
| 5,713,623 | 2/1998 | Mattingly . |
| 5,775,761 | 7/1998 | Asami et al. .......................... 296/37.7 |
| 5,810,420 | 9/1998 | Welling .................................. 296/97.5 |
| 5,887,929 | 3/1999 | Miller et al. ........................... 296/37.8 |
| 5,903,226 | 5/1999 | Suman et al. ...................... 340/825.69 |

FOREIGN PATENT DOCUMENTS

| | | |
|---|---|---|
| 147460 | 2/1982 | France . |
| 4116758 | 2/1992 | Germany . |
| 1141138 | 6/1989 | Japan . |
| 14335 | 7/1904 | United Kingdom . |
| 22630 | 10/1995 | United Kingdom . |

*Primary Examiner*—Joseph D. Pape

*Attorney, Agent, or Firm*—Harness, Dickey & Pierce, P.L.C.

[57] ABSTRACT

A storage bin is pivotally mounted to a housing and includes a recess having a latching surface which extends in a plane generally orthogonal to the direction of angular motion of the storage bin when it moves from a closed to an open position. A pivoted latch member is mounted in spaced pivotal relationship to the housing and has an end forming a latch stop which selectively engages the latching surface of the recess of the storage bin for preventing movement of the storage bin by blocking movement of the storage bin.

28 Claims, 5 Drawing Sheets

LATCH FOR VEHICLE OVERHEAD STORAGE BIN

BACKGROUND OF THE INVENTION

The present invention relates to a vehicle console and particularly to a latch for a vehicle overhead console storage bin.

Vehicles frequently include storage compartments for a variety of items. Storage locations which are readily accessible to the operator are particularly popular and sunglass storage bins, for example, are frequently mounted in an overhead console of a vehicle. U.S. Pat. Nos. 4,469,365 and 5,713,623 are representative of such systems, which employ a latch mechanism to maintain the sunglass bin, which is integral with the cover, in a closed position. In order to open the storage compartment, a spring-loaded latch typically is employed in which a cam-operated button/latch bar cooperate to move a latching bar from within a slot in the storage bin to release the storage compartment which frequently includes a kick-out spring for allowing the user to subsequently lower the sunglass storage cover and integral bin for access to glasses stored therein. Such overhead compartments have also been employed for use in connection with the storage of garage door openers as taught by, for example, U.S. Pat. No. 4,595,228. These compartments, however, are not frequently opened and can use simple molded spring latches which may not be sufficiently reliable and, therefore, unsuitable for frequently used storage bins. A variety of other more durable latch mechanisms have been provided which typically involve somewhat complicated springs, sliding bars and the like to assure that the storage bin remains safely closed during operation of the vehicle so as not to distract the operator and can be opened only when desired.

There remains a need, however, for a relatively inexpensive and reliable latch which provides the desired latching function, which does not require significant complicated mechanisms and which is easy to assemble and, therefore, less costly than cam-operated latch bars and other known mechanisms.

SUMMARY OF THE PRESENT INVENTION

The storage bin latch system of the present invention provides such structure by utilizing the weight of the storage bin together with its kick-out spring as a latch engaging locking force against a latch member which can be pivoted between a locking position and a release position in which the storage bin is allowed to open under the effect of gravity and a kick-out spring. In a preferred embodiment of the invention, a pivotally mounted storage bin includes a surface with a recess having a latching surface which extends generally orthogonal to the direction of motion of the storage bin when it moves from a closed to an open position and a latch member mounted in spaced pivotal relationship to the storage bin and having an end forming a latch stop which selectively engages the latching surface of the recess of the storage bin for preventing movement of the storage bin by blocking its movement. The latch member integrally includes an actuator button on a side of the pivot axle remote from the end for pivoting the latch member out of contact with the latching surface, allowing the storage bin to move from a stored position to an open position for access to contents stored therein.

In the preferred embodiment of the invention, the storage bin comprises a sunglass storage bin with an outer surface which forms a cover for the storage area of the console in which the sunglass storage bin is pivotally mounted. In the preferred embodiment also, the console may include other vehicle accessories such as map lamps, an electronic compass, a Travelnote® digital recorder and a HomeLink® trainable transceiver.

These and other features, objects and advantages of the present invention will become apparent upon reading the following description thereof together with reference to the accompanying drawings.

DETAILED DESCRIPTION OF THE PREFERRED EMBODIMENT

Figure 1:
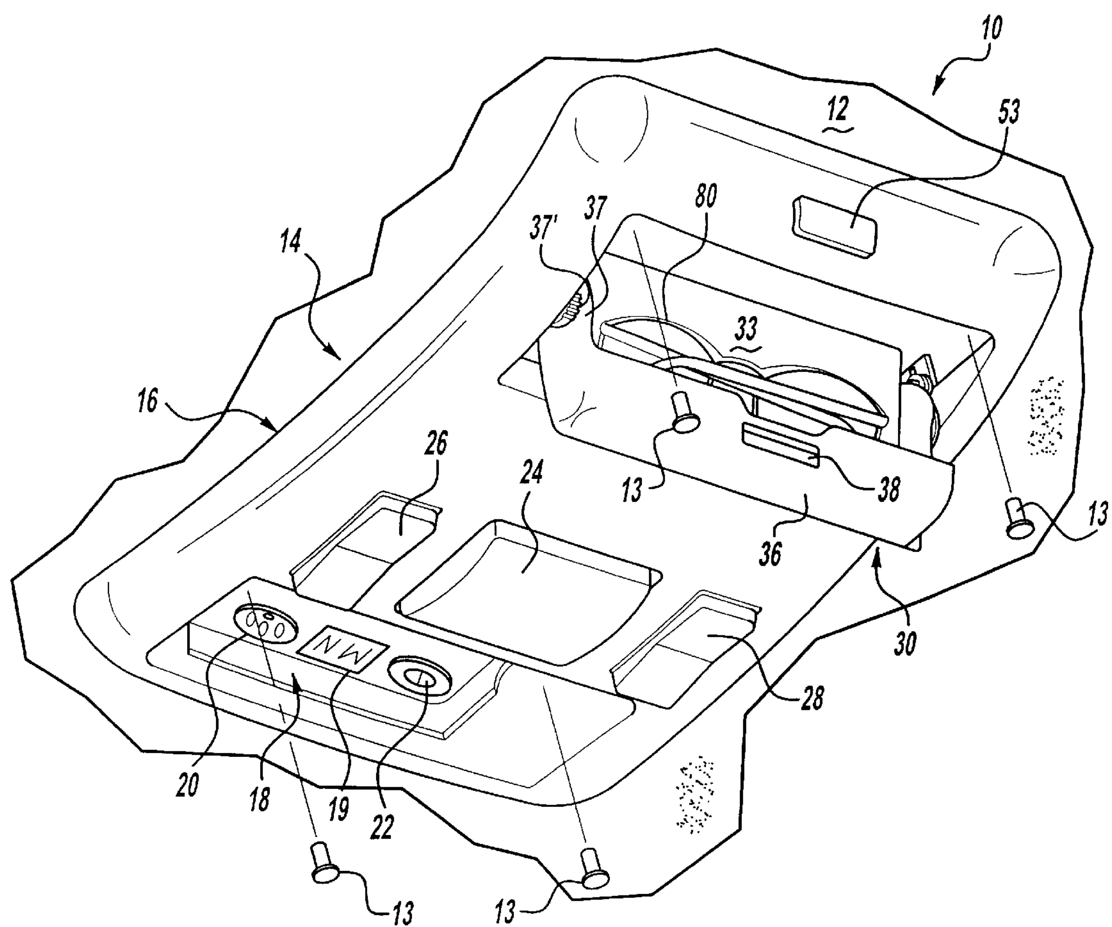
FIG. 1 is a fragmentary perspective view of a vehicle with an overhead console having a storage bin embodying the present invention, shown with the storage bin in an open position for access thereto.

Referring initially to FIG. 1, there is shown a vehicle 10, such as an automobile, sport utility vehicle, van, pickup truck or the like, which includes a structural roof covered in the interior of the vehicle by a headliner 12 which can be molded and attached to the underlying sheet metal structure of the roof in a conventional matter. Mounted to the vehicle roof and headliner 12, utilizing suitable threaded fasteners 13, is an overhead console 14 embodying the present invention. Console 14 will typically be mounted to the headliner and vehicle roof adjacent the front windshield centered between the front seats of the vehicle for easy access to the console by both the vehicle operator and a front seat passenger. Console 14 includes a molded polymeric housing 16 typically made of ABS, polycarbonate or other suitable polymeric material, which can be integrally molded and which is suitable for the automotive environment. Mounted within housing 16 is an electronic module 18 which may include an electronic compass and display 19, such as described in U.S. Pat. No. 5,737,226, a trainable transceiver 20 which can be employed in connection with controlling remote control devices such as garage door opening mechanisms, remotely operated home appliances or the like, such as described in U.S. patent application Ser. No. 08/368,232 filed Jan. 3, 1995, entitled PROGRAMMABLE RECEIVER AND CONTROL CIRCUIT. Now U.S. Pat. No. 5,903,266. Electronic module 18 may also include a digital message recorder and playback module 22 of the type described in U.S. Pat. application Ser. No. 08/709,463, filed Sep. 3, 1996, entitled MEMO VISOR. Now U.S. Pat. No. 5,810,420. Electronic module 18 typically is mounted forwardly in the vehicle in the overhead console 14 to allow access to transceiver 20 and recorder 22.

Console 14 further includes an overhead dual map lamp assembly 24 with actuator switches 26 and 28, respectively, allowing the vehicle operator or passenger to control the lamps positioned behind the map lamp lens for directing illumination downwardly toward the interior of vehicle 10. Positioned rearwardly in the vehicle and pivotally mounted to the housing 16 is an overhead storage bin 30 including a latch assembly 50 of the present invention, which is now described in connection with FIGS. 2–6.

Storage bin 30 comprises an integrally molded generally concave member having a curvilinear cover 32 with an external surface 34 defining the outer surface of cover 32 (FIGS. 4–6), which defines an interior floor 33 for the storage bin 30. Bin 30 includes an upwardly projecting curved wall 36 extending from cover 32 and including a latching recess 38 (FIGS. 1 and 3) formed centrally between integrally-formed end walls 37, 39. Each of the end walls 37, 39 include outwardly projecting pivot axles 31 (FIG. 3), which extend within pivot axle receiving apertures 17 in the sides 46 and 47 of a generally rectangular frame 40 extending upwardly from the central horizontally extending wall 42 of housing 16. The rectangular frame 40 includes a rear lip 44 and sidewalls 46, 48 which pivotally receive and support storage bin 30 and forward wall 43 having spaced sockets 45 and 47 for pivotally receiving axles 55 of a push-button pivoted latch member 52, as described below. For purposes of clarity, the electronic module 18, map lamp 24 and switches 26 and 28 are not shown in FIGS. 2 and 3, but only the overhead console 16 with the relevant frame 40 for a storage bin 30. Console housing 16 includes a rearward (as viewed in the vehicle) facing surface 11 with an aperture 15 through which the latch member 52 extends when assembled as seen in FIGS. 1, 2 and 4–6.

Figure 3:
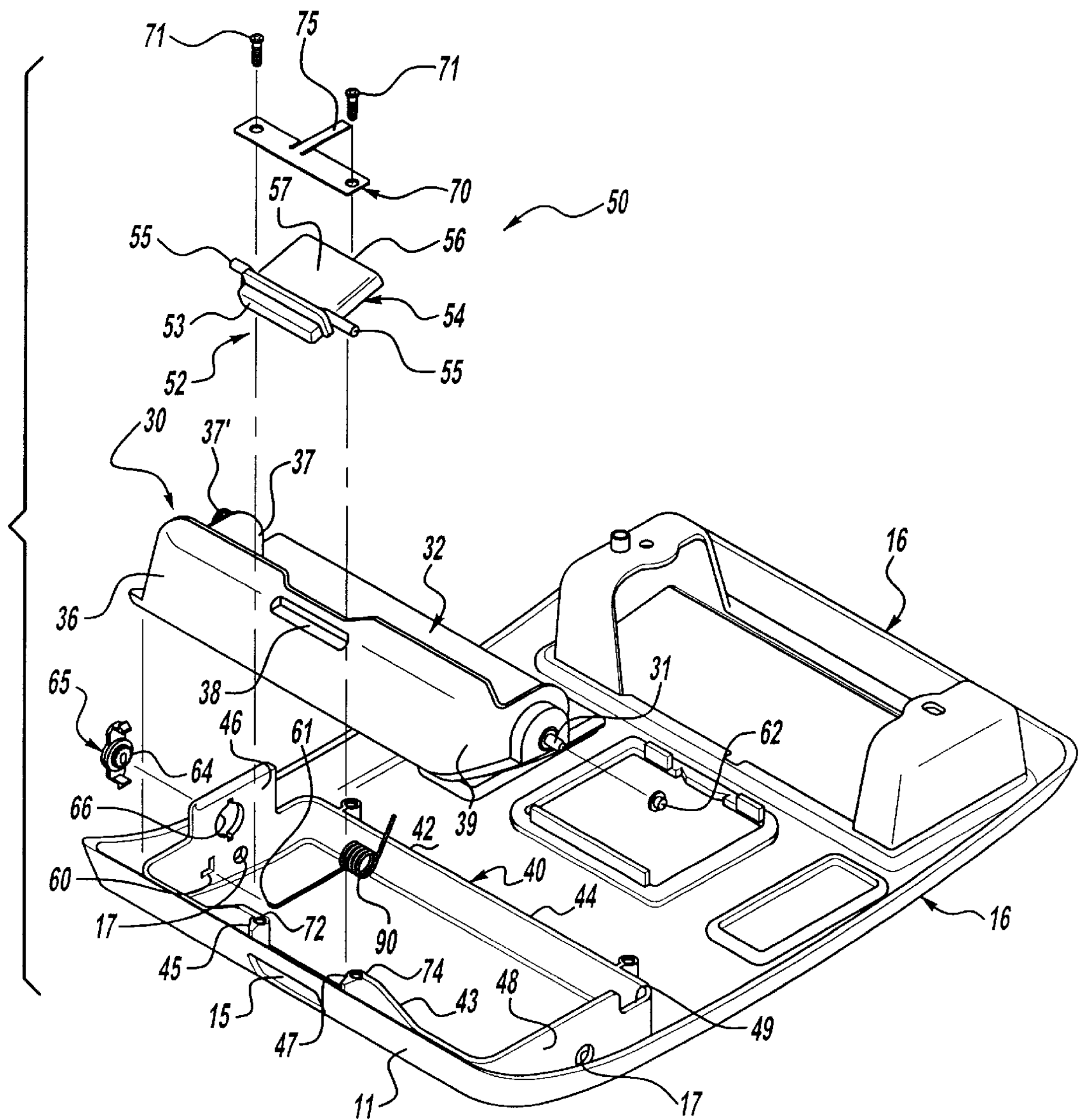
FIG. 3 is an exploded perspective view of the console housing and storage bin shown in FIGS. 1 and 2.

As best seen in FIG. 3, left pivot axle 31 is surrounded by a coil kick-out spring 90 which surrounds the pivot axle and has an end 61 which engages aperture 60 in wall 46 and has an opposite end which engages a tab (not shown) on wall 37 of bin 30 to urge the storage bin 30 to an open position in a conventional manner. A bushing 62 extends over each of the pivot axles 31 and captively holds the spring 90 in place as well as provides the smooth pivoting mounting of the bin 30 to housing 16. The left wall 37 of storage bin 30 includes arcuate gear teeth 37' (FIGS. 1 and 3) which engage the rotator gear 64 of a viscous damper 65 of conventional construction which is snap-fit within an aperture 66 in sidewall 46 of housing 16 to control the motion of storage bin 30 as it is rotated from a closed position, as seen in FIG. 4, to an open position, as seen in FIGS. 1 and 6.

The latch member 52 includes a main body 54 having an actuator button 53 extending from one end thereof and an end 56 defining a stop which selectively engages the latching surface 38 of storage bin 30 as described below in connection with FIGS. 4–6. Intermediate actuator button 53 and latch end 56 is a pair of outwardly extending pivot axles 55 which extend in recesses 45 and 47 in the configured front wall 43 of frame member 40. Actuator button 53 is a generally rectangular reduced sized member which extends through aperture 15 in rearward facing wall 11 of console housing 16, while its main body 54 extends toward the wall 36 of bin 30 with end 56 selectively engaging latching surface 38 of the storage bin 30. In some embodiments, the latching member 52 has a length and a weight sufficient to be gravity operated such that it is normally in a lowered position as seen in FIG. 6, however, to assure positive latching operation, in a preferred embodiment, a T-shaped leaf spring 70 (FIGS. 2–6) is provided which is secured to mounting bosses 72 and 74 of walls 43 of rectangular frame 40 by means of fastening screws 71. Spring 70 holds pivot axles 55 in recesses 45 and 47 and is made of a thin metal spring material with a tang 75 defining a bias member extending over the top surface 57 of body 54 of latch member 52 as best seen in FIGS. 4–6 to urge the latch member 52 downwardly and pivoted in a counterclockwise direction, as viewed in FIGS. 4–6. The operation of the storage bin 30, which is defined by the support floor 33 of cover 32 and the inner surface of wall 36 is now described in connection with FIGS. 4–6.

Figure 2:
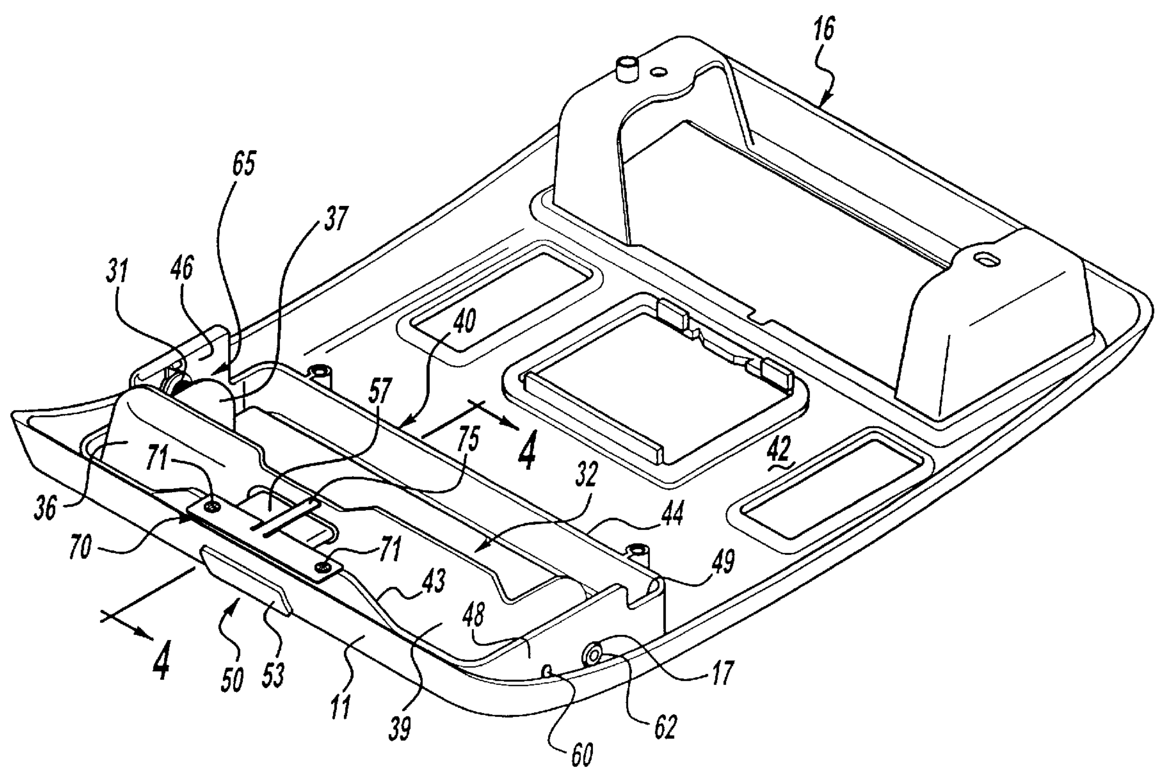
FIG. 2 is a fragmentary perspective view of the console shown in FIG. 1, shown from above with the storage bin in a closed position.
Figure 4:
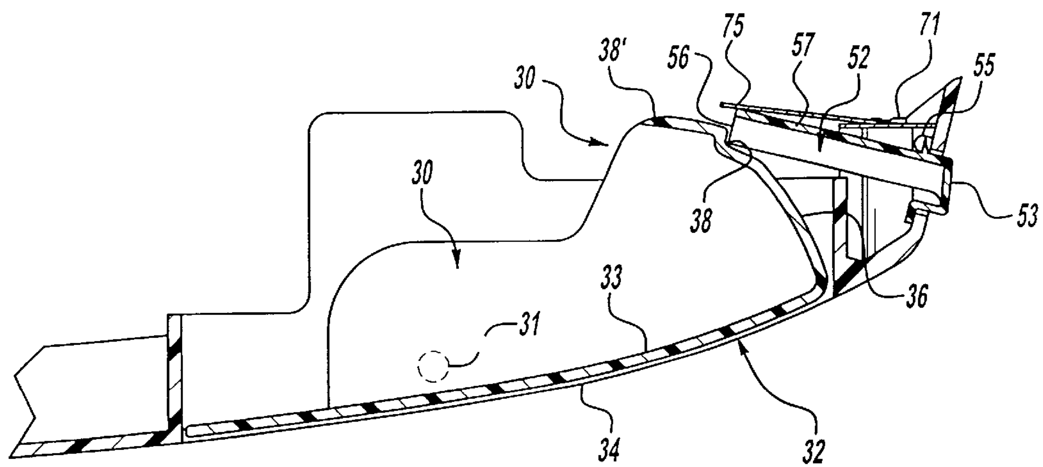
FIG. 4 is a fragmentary enlarged cross-sectional view of the storage bin, taken along section lines IV—IV of FIG. 2.
Figure 5:
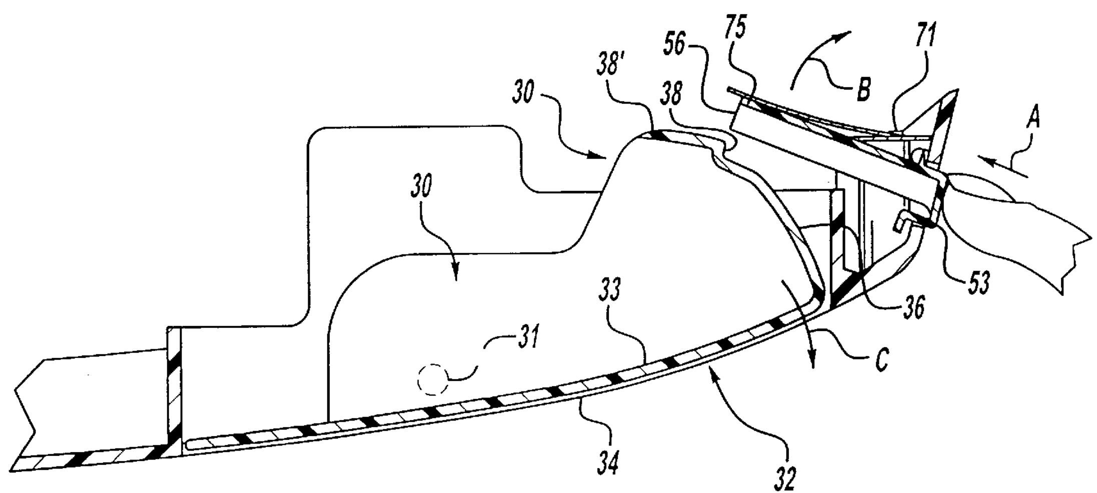
FIG. 5 is a fragmentary cross-sectional view of the storage bin as seen in FIG. 4 but showing the latch moved to a releasing position.
Figure 6:
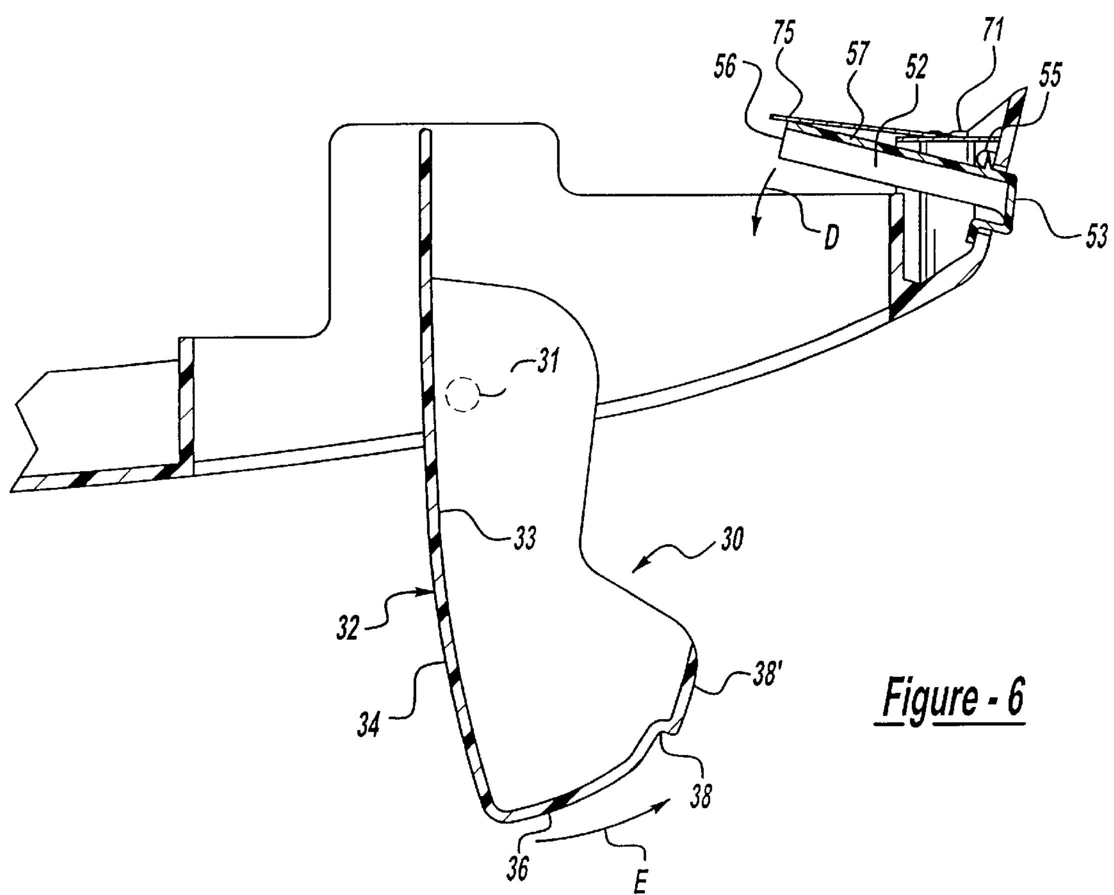
FIG. 6 is a fragmentary cross-sectional view of the structure shown in FIGS. 4 and 5 with the storage bin in the open position for access thereto.

In FIG. 4, corresponding to the position of the storage bin, as shown in FIG. 2, the latch surface 38 of storage bin 30 engages end 56 of latch member 52 which prevents the pivoting of the storage bin 30 about its pivot axles 31 in a downward direction (in a clockwise direction as seen in FIGS. 4–6). When a person depresses the actuator button 53 inwardly as illustrated in FIG. 5 by finger pressure as indicated by arrow A, latch member 52 rotates upwardly in a clockwise direction as indicated by arrow B in FIG. 5 against the pressure of spring 75 such that end 56 clears latch surface 38 allowing the storage bin to pivot downwardly in the direction indicated by arrow C to the fully open position as shown in FIG. 6. The motion of storage bin 30 is controlled by the kick-out spring 90 as well as the rotary damper 65 to provide a smooth controlled motion of the storage bin to the lowered use position for access to the storage compartment defined by the concave interior surface of the storage bin for storage of items such as sunglasses 80 therein, as illustrated in FIG. 1.

When the storage bin 30 is released, pressure can be removed from actuator button 53 and the actuator 52 rotates downwardly as indicated by arrow D in FIG. 6 under either influence of gravity or with the assistance of bias spring 75. Once access to the storage bin has been obtained, the storage bin can again be closed by manually rotating the storage bin upwardly in a counterclockwise direction as indicated by arrow E in FIG. 6, whereupon the curved surface 38' of forward edge 36 of the storage bin 30 engages end 56 of latch member 52 moving it against the pressure of spring 75 until the end 56 again engages the latch surface 38 holding the bin 30 in the closed position, as viewed in FIGS. 2 and 4.

Thus, the console and storage bin of the present invention provides a smooth operating, reliable and relatively inexpensive system for latching the storage bin in a closed position which eliminates the complex mechanism of many prior latch systems and which relies upon the interference between a pivoted latch member and a latching surface of the storage bin for latching the storage bin in position and for pivoting the latch member to provide clearance for movement of the storage bin when the latching member is actuated.

Various modifications to the preferred embodiment of the invention may be made by those skilled in the art without departing from the spirit or scope of the invention as defined by the appended claims.

What is claimed is:

1. A storage bin for a vehicle comprising:

a support housing;

a storage bin pivotally mounted to said Support housing and including a latching surface extending in a plane generally orthogonal to the direction of angular motion of said storage bin, said storage bin having a first direction of rotation when pivotally moving from a closed position to an open position thereby allowing access to said storage bin; and a latch member pivotally mounted to said support housing and including an end engaging said latching surface for preventing rotation of said storage bin, said latch member being pivotally movable about a first direction of rotation to a release position in which said end rotates from a position engaging said latching surface to a position disengaging said latching surface, said first direction of rotation of said latch member being generally opposite that of said first direction of rotation of said storage bin.

2. The storage bin as defined in claim 1 and further including a bias spring coupled between said latch member and said housing for urging said end of said latch member into engagement with said latching surface.

3. The storage bin as defined in claim 1 wherein said storage bin is a sunglass storage bin.

4. The storage bin as defined in claim 1 wherein said support housing is an overhead console.

5. The storage bin as defined in claim 4 wherein said storage bin is a sunglass storage bin.

6. The storage bin as defined in claim 5 and further including a bias spring coupled between said latch member and said housing for urging said end of said latch member into engagement with said latching surface.

7. The storage bin as defined in claim 1 wherein said support housing includes an electronic compass.

8. The storage bin as defined in claim 1 wherein said support housing includes a digital voice recorder.

9. The storage bin as defined in claim 1 wherein said support housing includes a trainable RF transmitter.

10. The storage bin as defined in claim 9 wherein said support housing includes an electronic compass.

11. The storage bin as defined in claim 10 wherein said support housing includes a digital voice recorder.

12. An overhead console for a vehicle comprising:

a console housing for mounting to the roof of a vehicle;

a generally concave storage bin pivotally mounted to said housing and including a wall having a recess defining a latching surface, said bin pivotally mounted to said housings said storage bin having a first direction of rotation downwardly from said housing for access to said bin; and a latch member pivotally mounted to said housing and including an end engaging said latching surface for blocking rotation of said storage bin, said latch member being pivotally movable in a direction generally opposite that of said first direction of rotation of said storage to a release position in which said end rotates from a position engaging said latching surface to a position disengaging said latching surface, allowing said bin to rotate downwardly for access.

13. The console as defined in claim 12 wherein said latching surface extends in a plane generally orthogonal to the direction of rotation of said bin.

14. The console as defined in claim 13 wherein said latch member includes a spring for urging said latch member into engagement with said latching surface.

15. The console as defined in claim 14 wherein said storage bin is a sunglass storage bin.

16. The console as defined in claim 15 wherein said housing includes an electronic compass.

17. The console as defined in claim 16 wherein said housing includes a digital voice recorder.

18. The console as defined in claim 17 wherein said housing includes a trainable RF transmitter.

19. A storage bin for a vehicle comprising:

a support housing having an edge with spaced-apart axle receiving sockets and at least one boss for receiving a fastener;

a storage bin pivotally mounted to said support housing and including a latching surface;

a latch member including axles pivotally mounted to said sockets and including a first end engaging said latching surface for preventing rotation of said storage bin, said latch member including an actuator button extending from a second end remote from said first end, said latch member pivotally movable to a release position in which said first end rotates from a position engaging said latching surface to a position disengaging said latching surface; and a leaf spring fastened to said housing by a fastener extending into said boss, said leaf spring engaging said latch member for urging said first end of said latch member into engagement with said latching surface and for holding said latch member to said housing.

20. The storage bin as defined in claim 19 wherein said spring is T-shaped with ends overlying said axles of said latch member.

21. The storage bin as defined in claim 20 wherein said storage bin is a sunglass storage bin.

22. The storage bin as defined in claim 21 wherein said support housing is an overhead console.

23. The storage bin as defined in claim 22 wherein said support housing includes an electronic compass.

24. The storage bin as defined in claim 23 wherein said support housing includes a digital voice recorder.

25. The storage bin as defined in claim 24 wherein said support housing includes a trainable RF transmitter.

26. A covered vehicle compartment comprising:

a housing defining a compartment, said housing having an edge with spaced-apart axle receiving sockets and at least one boss for receiving a fastener;

a cover pivotally mounted to said housing and including a latching surface;

a latch member including axles pivotally mounted to said sockets and including a first end engaging said latching surface for preventing rotation of said cover, said latch member including an actuator button extending from a second end remote from said first end, said latch member pivotally movable to a release position in which said first end rotates from a position engaging said latching surface to a position disengaging said latching surface; and a leaf spring fastened to said housing by a fastener extending into said boss, said leaf spring engaging said latch member for urging said first end of said latch member into engagement with said latching surface and for holding said latch member to said housing.

27. The compartment as defined in claim 26 wherein said housing includes an aperture and said actuator button extends through said aperture.

28. The compartment as defined in claim 27 wherein said spring is T-shaped with ends overlying said axles of said latch member.

* * * * *